June 26, 1956   H. F. RAGLAND   2,752,574
METHOD AND APPARATUS FOR ELECTRICAL FILTERING
Filed Oct. 6, 1950

Inventor:
Harry F. Ragland,
by *Claude A. Mitt*
His Attorney.

United States Patent Office 2,752,574
Patented June 26, 1956

2,752,574
METHOD AND APPARATUS FOR ELECTRICAL FILTERING

Harry F. Ragland, Schenectady, N. Y., assignor to General Electric Company, a corporation of New York Application October 6, 1950, Serial No. 188,796

8 Claims. (Cl. 333—70)

This invention relates to electrical filtering and more particularly to a method and means for divorcing spurious signals from desired signals within a common frequency spectrum.

One of the fundamental limitations to higher performance tracking with automatic gun laying systems has been the presence of noise or spurious error signals in the signal received from the radar. There has heretofore been no convenient way of separating the noise from the true signal within the same frequency spectrum, and it has been past practice to attenuate both signals. This however has resulted in intolerable tracking errors.

When tracking a moving target, the control signal which is amplified to drive the antenna can be divided into two components—a true control signal representing the velocity of the target, and spurious signals, or noise, which must be eliminated to prevent driving the antenna at an erroneous velocity.

The target relative angular velocity is a time variable which may be considered to be composed of a spectrum of superposed sinusoidal variations of certain frequencies. Existing methods of eliminating noise are to pass the control signal through filters which attenuate frequencies above the target velocity or true control signal frequency spectrum.

As is usually the case, the frequency spectra of the true and error signals overlap, and attempts to filter the components of the error signal in the common region will result in a similar attenuation of those components of the true signal also in the common region. Thus, attempts to remove all of the error signal often results in creating a greater error between the true signal and the remaining signal than existed between the true signal and the total signal before filtering.

It is an object of this invention to provide a novel method of attenuating noise signals which lie within the frequency spectrum of a true or desired signal.

It is a further object of this invention to provide novel filter apparatus which is based on the principle of clothing the input signal with invariant characteristics.

It is still another object of this invention to provide a conversion means for modifying a signal prior to the removal of its noise components and then producing a signal which is proportional to the original signal with the undesirable components omitted.

According to my invention, noise attenuation is accomplished by altering the true signal, before filtering, in order to obtain a true signal of more invariant characteristics. Thus, the true signal is made constant, or substantially invariant, while the noise signals remain substantially unchanged with respect to frequency thus permitting the use of a heavy filter to eliminate the high frequency noise signals without attenuating the substantially constant true signal. After the altered signal has passed through the filter to have its high frequency noise components removed, it is then converted to a signal proportional to its original characteristics. This change in signal characteristic is obtained through multiplication of the signal by the proper time variable. After filtering, a signal proportional to the true signal is produced by dividing by the same time variable.

The invention will be more fully understood by referring now to the accompanying drawings wherein.

Figure 1:
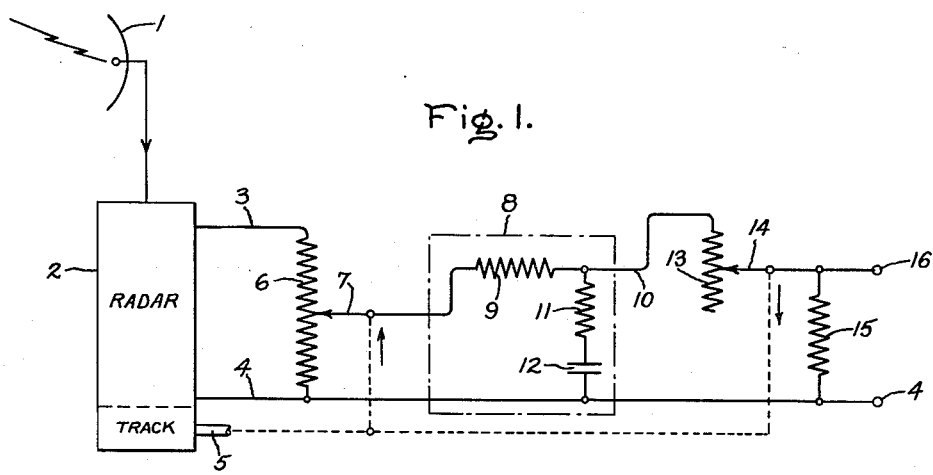
Fig. 1 is a schematic representation of my novel filtering means.

Referring now to Fig. 1, there is shown a simple circuit illustrating my novel filtering scheme which I shall describe with reference to an aircraft radar tracking application in order to more clearly present my invention.

As mentioned above, one of the fundamental limitations in radar tracking systems has been the presence of noise or spurious error signals in the signal from the radar. Such noise is due to many reasons such as changing atmospheric conditions, propeller modulation of signals reflected from the aircraft, changing target aspect or reflecting area as the center of reflection of the target wanders from wing tip to wing tip, engine to engine, or nose to tail, target polarization, and other uncontrollable variables. Since the signal is transmitted to the power drives which direct the guns, it is essential that it be as accurate as possible.

In Fig. 1 I have shown a radar dish 1 which receives the reflected signal containing noise or spurious errors from the target. These signals are transmitted to radar equipment 2, which equipment is well understood by those skilled in the art and is not described here since it is not a part of this invention. It should perhaps briefly be added, however, that the radar equipment provides information with respect to the range, angular velocity and position of a target, which information is employed to direct guns on the radar equipped fighter aircraft. As is well known, the angular velocity of a target may be represented in terms of a voltage, and it is this voltage which we may assume has the random noise signals which it is desired to eliminate and which is thus fed to the input 3—4 of my novel filter.

In a manner which is well known, radar equipment also provides range information and for the purpose of explaining my invention, we may assume that this information is available as a function of the movement of a mechanical drive, the position of which represents the distance between the radar equipped fighter aircraft and the target. Alternately, the computer associated with some radar equipments require a mechanical drive which varies as a function of $R^2$ (range squared) for the purpose of making automatic computations required to direct the guns. In Fig. 1, I have shown schematically, a drive shaft 5 which in the present application may represent a means rotating as a function of $R^2$ the purpose of which means will be hereinafter explained.

The signal which is applied at the input 3—4 and which may be referred to as the total signal, is impressed across a potentiometer 6 which has a movable brush 7 connected to be driven by the shaft 5. The signal between the brush 7 and the input lead 4 is then passed through a filter 8 which comprises a resistor 9 in series between the brush 7 and the output of the filter 10. In shunt between the output 10 and the common lead 4 there is connected a resistor 11 and a capacitor 12 in series.

The signal from the output of the filter is then passed through what is known as a divider. This divider comprises a resistor 13 one end of which is connected to the lead 10 and the other end of which remains unconnected. This resistor has a brush 14 which is also connected to move with the shaft 5. Across the brush 14 and lead 4 there is connected a load resistor 15 across which the output is taken at terminals 16 and 4.

With the foregoing understanding of the elements and their organization, the operation of my invention will be readily understood from the following explanation.

Figure 2:
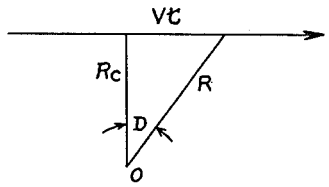
Fig. 2 is a diagram for explaining Fig. 3.

Looking now at Fig. 2, let us assume that the line of the arrow represents a moving target. Assuming for the moment that the target is flying a relative straight line coplanar course at a constant speed and the point O is considered to be stationary, then it will be seen that with respect to the distance between point O and the line of the target the range will decrease gradually until it reaches its crossover range $R_c$. The range will thereafter increase to a point R, at which instant the target may be said to be travelling at a certain angular velocity $w$ and will have reached a position beyond the crossover range which may be represented by the angle D.

The angular position of the line of sight (which in this case happens to be the bearing angle) is given by $$D = \tan^{-1}\frac{Vt}{R_c}$$

then, $$\frac{dD}{dt} = w = \frac{V/R_c}{1+V^2t^2/R_c^2} = \frac{R_c V}{R_c^2 + V^2 t^2}$$

and $$R^2 w = (R_c^2 + V^2 t^2)\frac{R_c V}{R_c^2 + V^2 t^2} = R_c V = \text{constant}$$

where $V$ = velocity of target relative to ownship (assumed to be constant))
$t$ = time measured from crossover
$w$ = angular velocity relative to ownship
$R_c$ = crossover range From the foregoing it will be seen that $w$ is a reciprocal function of $R^2$ so that the quantity $R^2 w$ is a constant for targets flying a relative coplanar straight line course at constant speed. This is very significant since it will now be evident that two variables may be multiplied together to produce a quantity which has an invariant characteristic. That is, while $w$ and the range is continually changing in the foregoing case, the multiplication of $w$ by $R^2$ produces a quantity which is substantially constant.

Figure 3:
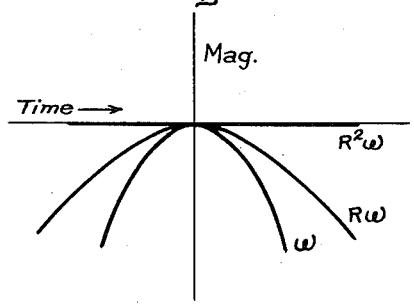
Fig. 3 is a series of curves to illustrate the meaning of an invariant characteristic.

Referring now to Fig. 3 there are plotted several curves which clearly show how multiplication of two signals produces a resulting signal having more invariant characteristics.

Conventionally for an application such as hereindescribed, smoothing is done in the servo tracking loop and is performed on a quantity which is substantially proportional to angular rate of the line of sight $w$. This quantity in general varies with time and therefore any attempt to attenuate noise by filtering it directly will result in distortion of the true signal $w$. On the other hand, if the characteristic of the desired signal can be made more nearly invariant, the noise can be rather heavily smoothed without much distortion of the true data. For example, Fig. 3 shows that the magnitude of $w$ does not remain at a constant value with respect to time. However, it will be seen that multiplying $w$ by R produces a quantity which is much more invariant with respect to time, and multiplying $w$ by the quantity $R^2$ produces a quantity whose characteristic is invariant with respect to time under the conditions previously explained. For specific target courses there may be other more advantageous functions than $R^2$ for producing an invariant characteristic. Therefore it should be clearly understood that, irrespective of the specific application, the object of my invention will remain the same, that is, to employ physical means which functions to alter the desired signal to one having a more invariant form prior to filtering and to subsequently obtaining a signal proportional to the desired signal.

Looking again at Fig. 1, let us assume that a varying signal E is applied across the potentiometer 6 and that this signal E has noise components which are to be removed. According to my invention the signal E is multiplied by moving the brush 7 by means which will cause a more invariant voltage to be presented to the input of filter 8. Multiplication per se is well known and therefore will not be explained in detail. Briefly, however, if a voltage, say 10 volts, is applied across a potentiometer and it is desired to multiply this voltage by a factor of .5, the brush is moved to the midpoint of the potentiometer and the output voltage is therefore 10 volts times .5 or 5 volts.

If the incoming signal applied across potentiometer 6 varies, but the brush 7 is moved so as to always maintain a substantially constant value of voltage between the terminals 7 and 4, then it will be seen that the voltage which is transmitted to the filter 8 will have substantially a D.-C. value upon which random noise or spurious signals will be superimposed, and thus in passing through the filter 8, these high frequency spurious signals will be bypassed through the condenser 12 while the constant or more invariant voltage will appear across the output of the filter.

It should be understood that if the signal appearing at the input 3—4 were not converted to an invariant quantity, the filter 8 would receive it directly and would thus be faced with the problem of bypassing not only the higher frequency noise components but also the higher frequency components of the true portion of the total signal. To avoid this in the past, it has been necessary to use a much lighter filter so as not to lose any of the components of the true signal in the process. However, with my invention, it will be clear that my filter 8 is merely faced with the problem of taking the ripples out of an otherwise fairly constant signal and therefore the filter may be much heavier.

The filter output across the leads 10 and 4 must now be modified so as to obtain a signal proportional to the original signal. This is done by means of a divider. The purpose of the divider is to operate on the output of the filter 8 by using a means which divides the filter output voltage by the same factor by which it was initially multiplied. For example, the brush 7 was positioned so that the voltage across the potentiometer 6 was multiplied by a function of range, namely $R^2$, and now similarly the brush 14 is positioned in a manner so as to divide the filter output voltage by the same function of range, namely $R^2$ in this case.

The operation of a divider per se is well known. The brush 14 is mechanically positioned so that the total resistance between lead 10 and lead 4 is proportional to $R^2$ and resistance 15 represents the minimum value which $R^2$ may be. The output voltage therefore is equal to the voltage at the output of the filter multiplied by the ratio of the resistance 15 to the total resistance between the lead 10 and the lead 4. If we consider the resistor 15 as equal to one, then the output voltage will be equal to the input voltage divided by $R^2$.

It will thus be seen that the brush 14 is positioned at the same rate as brush 7, although in the opposite direction so as to divide, and that therefore, the signal from the output of the filter will be a signal proportional to the original signal, but without the high frequency components which were bypassed by the filter.

While my smoothing method was developed for application on an automatic gun laying system, the fundamental principles can be applied and will be advantageous generally where: (1) ordinary methods of filtering cannot eliminate certain frequency components of a variable without seriously reducing frequency components to be retained; (2) the signal to be retained can be operated upon by another variable to change the characteristics of its spectrum in such a way as to permit eliminating the undesired frequency components without seriously affecting the components of the signal to be retained; and (3)

the variable to be used to modify the signal to be retained does not contain frequency components which are to be eliminated from the variable being filtered.

Although my invention is described in connection with a particular application, it will be seen that it lies principally in a method and means for filtering and that the environmental radar apparatus is merely included to provide a background for the explanation of this particular application.

Modifications of the particular embodiment illustrated and described will readily occur to those skilled in the art. It should be understood therefore that the invention is not limited to the particular arrangement disclosed but that the appended claims are intended to cover all modifications which do not depart from the true spirit and scope of the invention.

I claim:

1. Apparatus for filtering undesired signals from a source of variant oscillatory signals which variant signals have desired components and undesired components in the same frequency spectrum comprising, a multiplier including a potentiometer having a first movable brush, a low pass filter connected to said brush, a divider connected to said filter and comprising a second movable brush, and movable means for simultaneously positioning said brushes in accordance with a reciprocal function of said desired signal components thereby to initially produce an electric quantity having a substantially constant component including said desired signal component and a high frequency component including said undesired signal component and to reconvert said constant component to reproduce said desired signal component after their passage through said filter.

2. Electrical apparatus for filtering noise signals from a source of variant signals which include desired components in the same frequency spectrum comprising, a potentiometer for reducing the amplitude variations of the signals from said source, a low pass filter connected to the output of said potentiometer, a variable impedance dividing element for changing the amplitude variations of the filter signals by the same factor by which it was reduced by said potentiometer, and movable means positioned in response to a reciprocal function of said desired component and connected continually to adjust said potentiometer and said element thereby to filter said noise signals without disturbing said desired signal components.

3. The method of filtering an oscillatory electric signal to attenuate undesired components thereof within the frequency spectrum of said signal without attenuating desired components thereof which comprises, producing a variable function of said desired signal components, electrically multiplying said signal by said variable function to produce an electric quantity having a substantially constant component which is a function of said desired signal components, attenuating the high frequency components of said electric quantity, and electrically dividing the resulting signal by said variable function to reproduce said desired signal components.

4. In a filter for oscillatory electric signals having desired and undesired components in the same frequency range, means varying said electric signals inversely as a first function of said desired signal components to produce an electric quantity having a substantially constant component and a high frequency component including said undesired signal components, means for attenuating said high frequency component of said electric quantity, and means varying the remaining electrical quantity after attenuation directly as a first function of said desired signal components to reproduce said desired signal components.

5. In an apparatus for filtering a varying signal voltage having undesired noise components in the signal frequency range, multiplying means responsive to said signal voltage for varying said signal voltage inversely as a function of said desired components to produce an electric output voltage, means connected to the output of said multiplying means for filtering said output voltage to attenuate undesired noise components thereof, and dividing means connected to said filtering means for varying said filtered output thereof directly as a function of said desired components, thereby to reproduce said desired signal components.

6. In combination, a source of oscillatory signal voltage having desired and undesired components in the same frequency range, movable means positioned in response to a reciprocal function of said desired components, multiplying means including a potentiometer connected across said signal voltage source and having a slider connected to said movable means, a high frequency by-pass filter connected across a portion of said potentiometer selected by said slider, dividing means connected to the filter output and including a fixed impedance and a variable impedance having a second slider, said fixed and variable impedances being connected in series circuit relation and said second slider being connected for movement by said movable means.

7. The method of filtering an oscillatory electrical signal having a desired waveform and an undesired waveform superimposed thereon, which waveforms both contain frequency components within the same frequency spectrum, to thereby eliminate the undesired waveform while unaffecting the desired waveform comprising the steps of: shifting the frequency spectrum of the desired waveform from its original position, attenuating the undesired waveform, and reshifting the frequency spectrum of the desired waveform to its original position, said shifting step being performed by producing a variable function having a variation which is inversely related to the desired waveform, and combining said variable function with the oscillatory electrical signal; and said reshifting step being performed by recombining said variable function with the oscillatory signal remaining after the shifting and attenuating steps.

8. The method of filtering an oscillatory electrical signal to attenuate undesired components thereof within the frequency spectrum of said signal without attenuating desired components thereof, which comprises: producing a variable function inversely related to said desired signal components, electrically multiplying said signal by said variable function to produce an electric quantity having a substantially constant component which is a function of said desired signal components, attenuating the high frequency components of said electric quantity, and electrically dividing the resulting signal by said variable function to reproduce said desired signal component.

References Cited in the file of this patent
UNITED STATES PATENTS

| | | |
|---|---|---|
| 2,069,853 | Schade | Feb. 9, 1937 |
| 2,362,898 | Gilman | Nov. 14, 1944 |
| 2,481,562 | Bailey | Sept. 13, 1949 |